March 24, 1931.  W. PEYINGHAUS  1,797,791
MEANS FOR LUBRICATING BEARINGS
Filed June 22, 1929
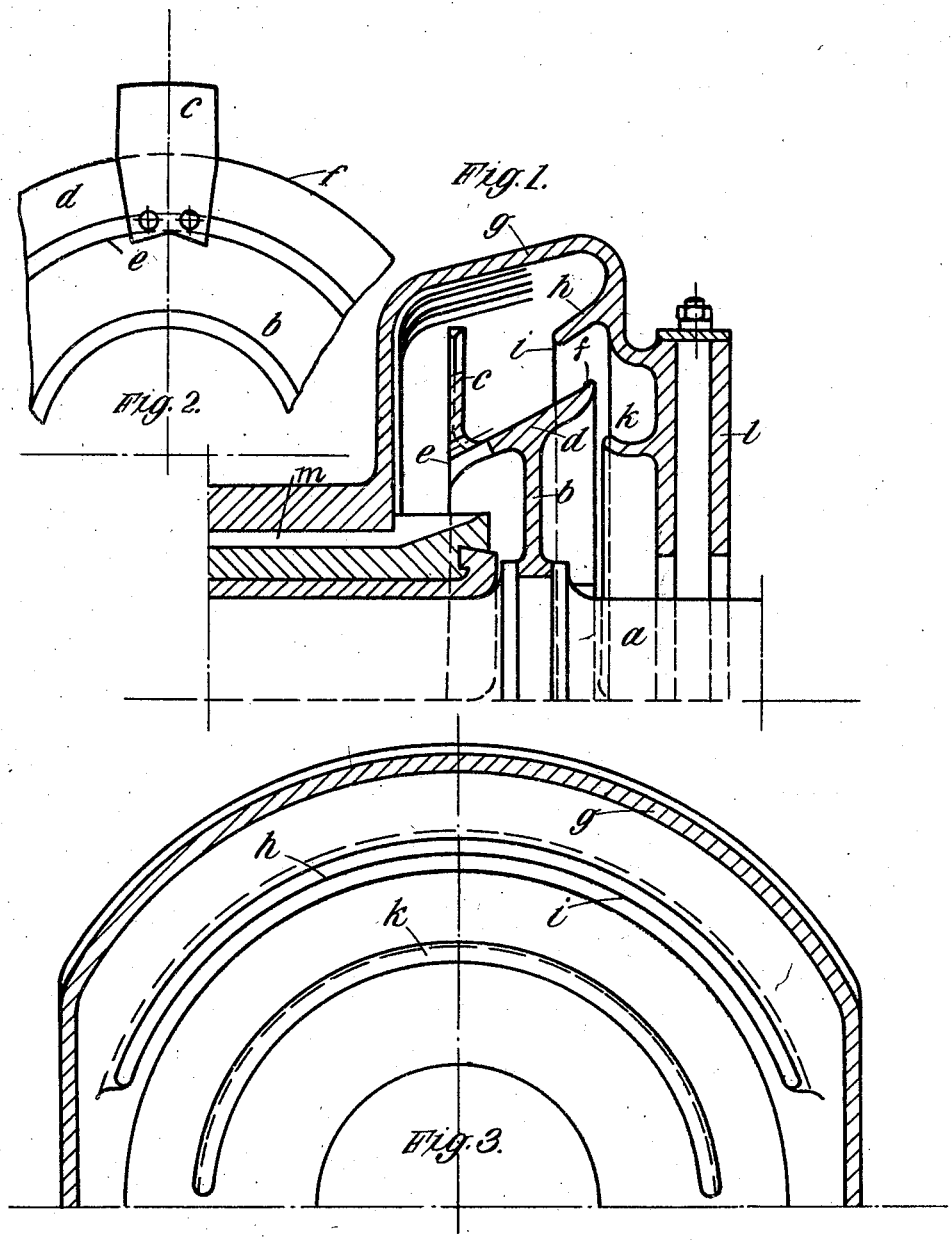

Patented Mar. 24, 1931

1,797,791

UNITED STATES PATENT OFFICE

WALTER PEYINGHAUS, OF BEZIRK HAGEN, GERMANY

MEANS FOR LUBRICATING BEARINGS

Application filed June 22, 1929, Serial No. 372,976, and in Germany June 23, 1928.

This invention relates to means for lubricating bearings, in particular the central bearings of railway vehicles, of the type in which a centrifugally acting member consisting of a disc is adapted to collect oil from a reservoir and to distribute it by centrifugal force over the inner wall of an outer casing so that it can pass therefrom by gravity into the oil receiving channel or channels of the bearing brass.

In connection with lubricating means of this type it has been proposed to employ a disc formed with a backwardly directed cylindrical projection the object of which was to direct any excess oil dropping from the upper wall of the casing not on to the shaft and thus into the dust joint of the bearing but back on to the wall of the casing or to let it flow into the oil bath.

The objects of the present invention, however, are to provide for the immediate utilization of the superfluous oil supplied by causing it to pass directly from the casing wall into the receiving channel or channels of the bearing brass whilst employing the crown of the centrifugally acting member as a bridge, and completely to protect the shaft and the dust joint of the bearing from contact with any of the superfluous oil.

According to the invention there is arranged directly underneath the upper wall of the casing an oil running-off apron which is formed with an oil dripping edge, which is inclined at an angle of about 45° to the axis of the axle and which projects or extends past the rear edge of the centrifugally acting disc so that the oil flowing off the apron will be kept away from the axle shaft.

In order that the said invention may be clearly understood and readily carried into effect the same will now be more fully described with reference to the accompanying drawings, in which:—

Figure 1 is a longitudinal section through a bearing embodying the invention;

Figure 2 is a fragmentary view of the centrifugal disc, showing one of the radial projections; and Figure 3 is a vertical sectional view through the casing looking towards the dust joint.

$a$ is the axle shaft, $b$ is the centrifugal disc which is secured to the shaft and $c$ are the radial projections which are formed on the disc so as to dip into the oil bath. $d$ is the conical part of the centrifugal disc and $e$ its dripping edge on the side of the bearing. $f$ is the turned over edge disposed at the other side of the centrifugal disc, $g$ is the outer casing and $h$ is the oil running-off apron which extends inwardly from the side of the casing which is remote from the bearing. $i$ is the dripping edge of the running-off apron and $k$ is the arcuate groove which is formed in the inner wall of the casing. $l$ is the dust joint and $m$ is one of the oil receiving channels formed in the upper part of the bearing brass. For convenience in assembling the centrifugal disc is preferably made in two parts.

The centrifugal disc is caused to perform two functions, (1) the supply of oil by centrifugal action with indirect projection on to the bearing brass and (2) the conduction of the superfluous oil supplied with direct projection on to the bearing brass. The shape of the centrifugal disc is determined by these two functions. The disc is formed so that its outer surface is of conical formation or is inclined at an angle of about 45° to the axis of the axle. The upper part of the inclined surface of the disc constitutes the bridge by which the superfluous oil is led from the casing wall into the receiving channel or channels of the bearing brass and the part of the disc which is adjacent the bearing is provided with one or more radial projections which are adapted to dip into an oil bath and to distribute the oil by centrifugal force over the inner surface of the casing. The arcuate portions of the inclined surface which lie between the radial projections are shaped to form oil dripping edges to permit an easier flowing over of the oil. If desired, the radial projections may, in order to facilitate the flowing of the oil into the receiving channel or channels of the bearing brass, be provided with holes at the points where they merge into the inclined surface. The other face of the centrifugal disc, that is to say, the face which is adjacent the dust joint, is turned over outwards at the edge in order to prevent any oil running down the side of the disc and into the dust joint. An arcuate groove may be formed in the inner wall of the casing which is adjacent the dust joint for the purpose of catching any oil which is thrown over and to lead it back into the oil bath.

What I claim as my invention and desire to secure by Letters Patent of the United States is:—

1. Bearing lubricating means comprising a casing, an oil reservoir formed in the lower part of the casing, and a disc provided with radial projections adapted to collect oil from the reservoir and to distribute it by centrifugal force over the inner wall of the casing, and with oil dripping edges between the radial projections, the said disc having an outer surface which is inclined at an angle of about 45° to the axis of the axle and having its smaller end directed towards the bearing.

2. Bearing lubricating means comprising a casing, an oil reservoir formed in the lower part of the casing, and a disc provided with radial projections adapted to collect oil from the reservoir and to distribute it by centrifugal force over the inner wall of the casing so that it can pass therefrom by gravity into an oil receiving channel of the bearing brass, the said disc having an outer surface which is inclined at an angle of about 45° to the axis of the axle, the smaller face of the disc being directed towards the bearing and the opposite outer edge of the disc being bent over outwards to prevent oil from running over said edge.

3. Bearing lubricating means comprising a casing, an oil reservoir formed in the lower part of the casing and a disc adapted to collect oil from the reservoir and to distribute it by centrifugal force over the inner wall of the casing, the said casing being provided at its upper part with an oil running-off apron which is inclined at an angle of about 45° to the axis of the axle and which projects beyond the rear edge of the centrifugal disc.

4. Bearing lubricating means comprising a casing, an oil reservoir formed in the lower part of the casing, a disc adapted to collect oil from the reservoir and to distribute it by centrifugal force over the inner wall of the casing and an oil running-off apron at the upper part of the casing and inclined at an angle of about 45° to the axis of the axle, the said disc being formed with an inclined outer surface so that any surplus oil dropping off the apron will be led by the crown of the disc into an oil receiving channel of the bearing brass.

WALTER PEYINGHAUS.